(12) United States Patent
Lishok et al.

(10) Patent No.: US 10,387,880 B2
(45) Date of Patent: Aug. 20, 2019

(54) LOCATION HISTORY AND TRAVEL PATH KNOWLEDGE BASED AUTHENTICATION

(71) Applicant: International Business Machines Corporation, Armonk, NY (US)

(72) Inventors: Natasha P. Lishok, Cary, NC (US); Michael S. Thomason, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 727 days.

(21) Appl. No.: 14/828,592

(22) Filed: Aug. 18, 2015

(65) Prior Publication Data
US 2017/0053280 A1 Feb. 23, 2017

(51) Int. Cl.
*G06Q 20/40* (2012.01)
*G06Q 20/32* (2012.01)

(52) U.S. Cl.
CPC ..... *G06Q 20/4014* (2013.01); *G06Q 20/3224* (2013.01)

(58) Field of Classification Search
CPC ..... G06Q 20/40; G06Q 30/02; G06Q 20/3224
USPC .......................................................... 705/44
See application file for complete search history.

(56) References Cited

U.S. PATENT DOCUMENTS

| 8,869,243 | B2 | 10/2014 | McGeehan et al. |
| 8,955,058 | B2 | 2/2015 | Castro et al. |
| 8,955,066 | B1 | 2/2015 | Ackerman et al. |
| 2009/0281719 | A1* | 11/2009 | Jakobson ........... G01C 21/3682 701/439 |
| 2014/0282870 | A1 | 9/2014 | Markwordt et al. |
| 2014/0282930 | A1 | 9/2014 | Markwordt et al. |
| 2015/0006399 | A1 | 1/2015 | Markwordt et al. |
| 2015/0121464 | A1 | 4/2015 | Hughes, Jr. et al. |
| 2015/0161366 | A1* | 6/2015 | Ghosh ..................... G06F 21/31 726/7 |

OTHER PUBLICATIONS

U.S. Appl. No. 14/805,714 entitled "Inferring Device Theft Based on Historical Location Data", filed Jul. 22, 2015.

* cited by examiner

*Primary Examiner* — Robert R Niquette
*Assistant Examiner* — Liz P Nguyen
(74) *Attorney, Agent, or Firm* — Edward J. Wixted, III

(57) ABSTRACT

Authenticating users based on answers to challenge questions relating to a "tracked user's" location history (that is, places the tracked user is known to have been). The "questioned user" may or may not be the same as the "tracked user." Some embodiments of the present disclosure are directed to generating questions to questioned users based on answers to challenge questions about aspects (for example, value and/or venue) of a desired transaction for which authentication is requested.

18 Claims, 4 Drawing Sheets

400

ACME DATABASE AUTHENTICATION

Q1: HOW MANY BAKERIES HAVE YOU VISITED?
A1: ONE
Q2: HOW FAR DID YOU TRAVEL BETWEEN 8:05A AND 9:05A THIS MORNING?
A2: ABOUT FIFTY MILES
Q3: WHAT WAS YOUR TOP SPEED BETWEEN 8:05A AND 9:05A THIS MORNING?
A3: ABOUT 60 MILES PER HOUR
Q4: WHERE WERE YOU WHEN YOU LISTENED TO THE SONG "JOHN IS A RAKE" ON YOUR SMART PHONE?
A4: SUBWAY STOP AT MAIN AND FIRST, ANYCITY, USA

YOU HAVE BEEN NOW GRANTED ACCESS TO THE ACME DATABASE, MR. JOHN SMITH

FIG. 4

LOCATION HISTORY AND TRAVEL PATH
KNOWLEDGE BASED AUTHENTICATION

BACKGROUND

The present invention relates generally to the field of identity security and more particularly to authentication of users with respect to financial transactions, emails and other electronic communications.

It is known that a user may have to provide personal information, in response to machine logic generated "challenge questions," in order to help establish the user's identity (that is, be "authenticated") for access to computer resources, such as access to computer-based financial transactions, emails and other electronic communications. For example, one popular challenge question is: "What is your mother's maiden name?"

"Geographic positioning systems" is hereby defined to mean any system that establishes the geographic location of a device using machine logic and wireless signals (now known or to be developed in the future); geographic positioning systems include positioning systems with a relatively local scope and positioning systems with a wider geographical scope. On known example of a geographic positioning system is called a Global Positioning System (GPS). GPS positioning is currently built into many personal computer devices, such as smart phone and GPS devices for use in motor vehicles.

US patent application 2015/0006399 discloses as follows: "An approach is provided to use social media content to verify the identity of a user. In the approach, a user authentication request pertaining to a user is received. In response, user questions and expected answers are retrieved from social media content that is accessible by the user. . . . Social media process, such as that performed by a social media website, collects dynamic social media content, such as comments, posts, tweets, multimedia, likes, requests, and other social media activities made by social media user community (e.g., by the user, the user's contacts, etc.). Activity data maintained by the social media site is stored in social media data store." (reference numerals omitted to avoid reference numeral confusion)

SUMMARY

According to an aspect of the present invention, there is a method, computer program product and/or system that performs the following operations (not necessarily in the following order): (i) receiving a location information data set relating to location information for a tracked user; (ii) generating, by machine logic, a first question based, at least in part, upon the location information data set; (iii) receiving, from a questioned user a first question answer data set representing the questioned user's answer to the first question; and (iv) evaluating, by machine logic, whether the questioned user's answer to the first question is a correct answer or an incorrect answer.

BRIEF DESCRIPTION OF THE DRAWINGS

FIG. 4 is a screenshot view generated by the first embodiment system; and

DETAILED DESCRIPTION

Figure 1:
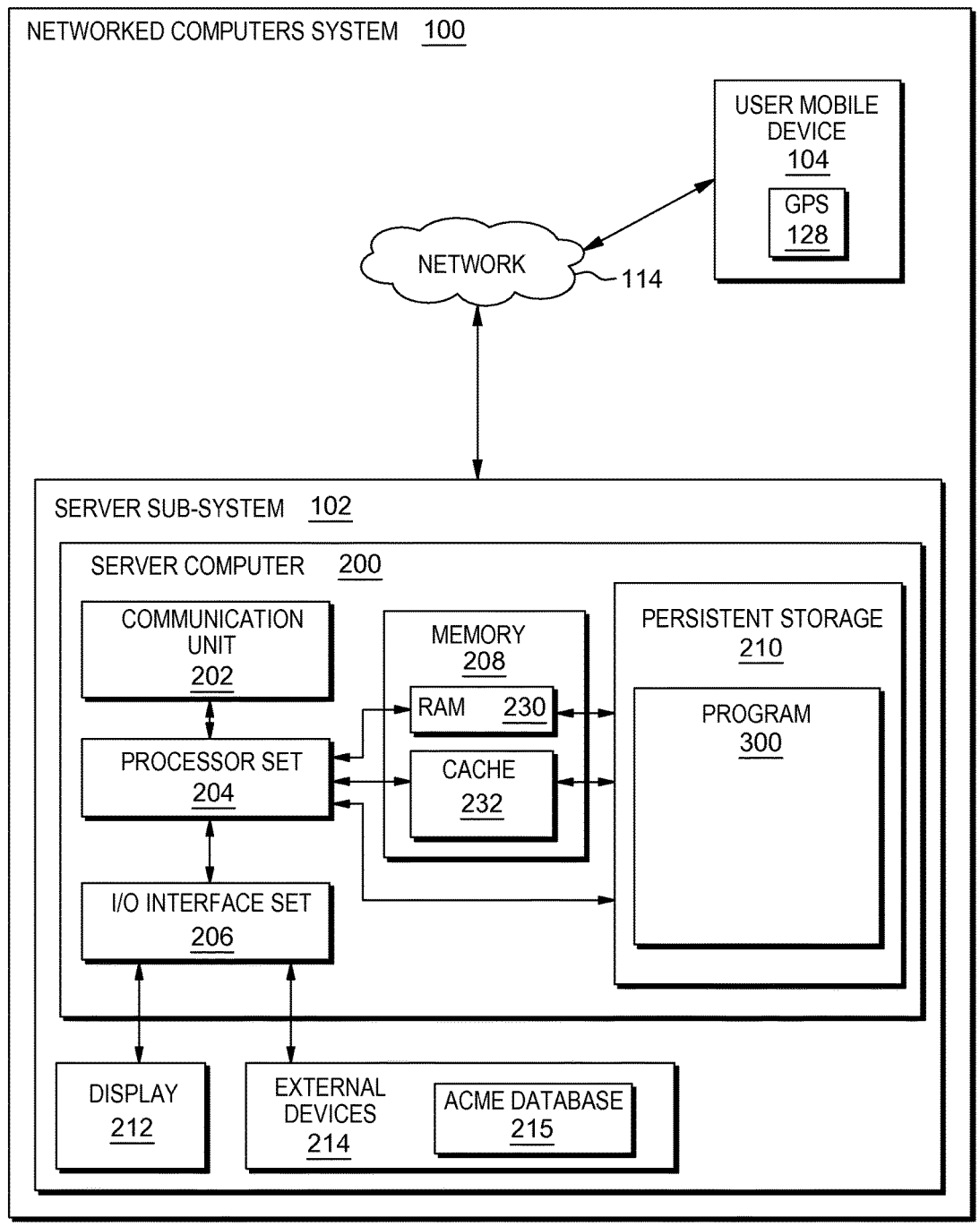
FIG. 1 is a block diagram view of a first embodiment of a networked computers system according to the present invention.

Some embodiments of the present disclosure are directed to authenticating users (see definition, below in the Definitions sub-section of this detailed description section) based on answers to challenge questions about a "tracked user's" location history (that is, places the tracked user is known to have been). The "questioned user" may or may not be the same as the "tracked user."

Some embodiments of the present disclosure are directed to generating questions to questioned users based on answers to challenge questions about aspects (for example, value and/or venue) of a desired transaction for which authentication is requested.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; user mobile device 104 (including GPS 128); communication network 114; server computer 200; communication unit 202; processor set 204; input/output (I/O) interface set 206; memory device 208; persistent storage device 210; display device 212; external device set 214 (including Acme database 215); random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
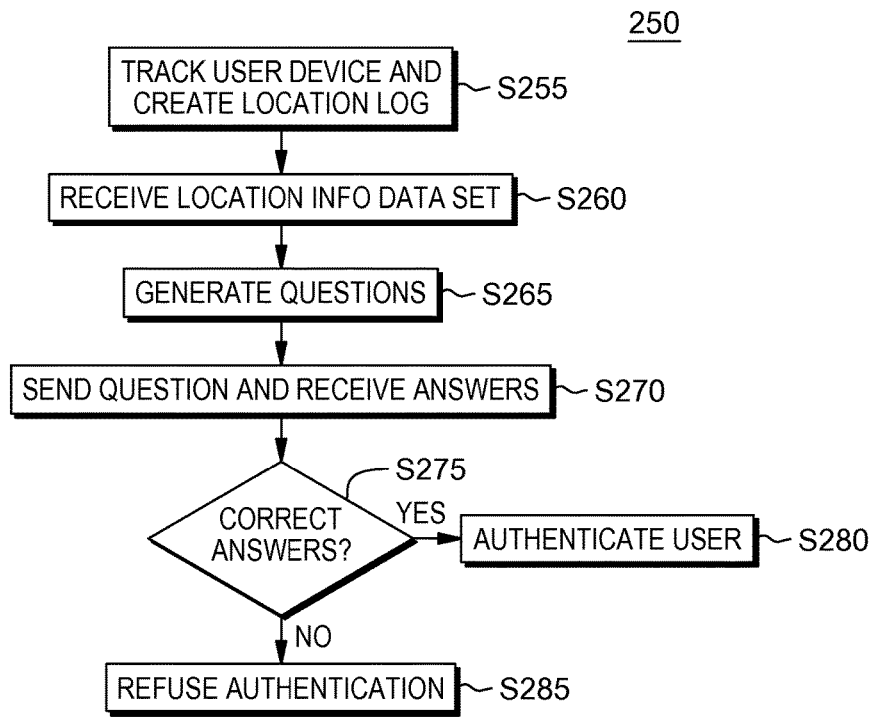
FIG. 2 is a flowchart showing a first embodiment method performed, at least in part, by the first embodiment system.
Figure 3:
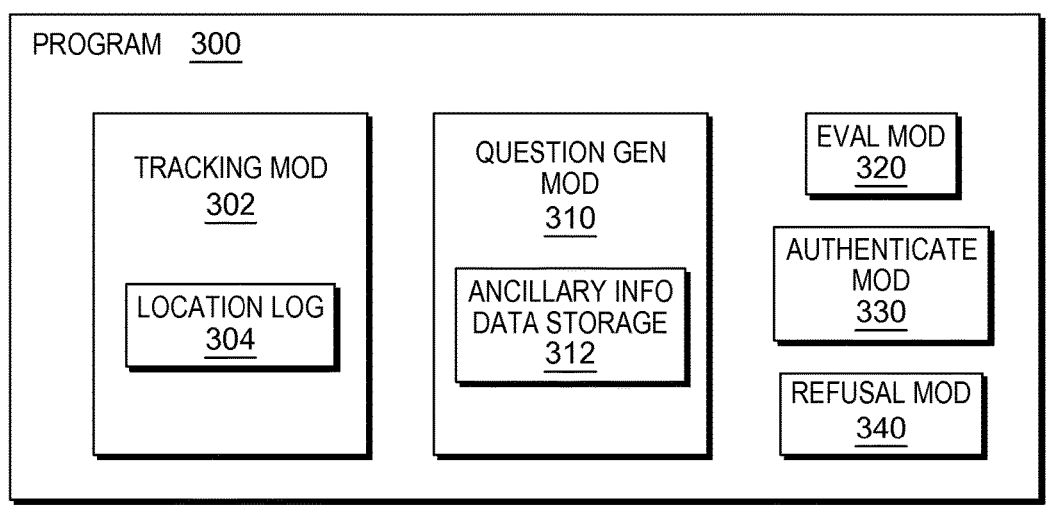
FIG. 3 is a block diagram showing an authentication system (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where tracking module ("mod") 302 tracks the positions, over time, of user mobile device 104 (see FIG. 1). More specifically, GPS 128 of user mobile device 104 intermittently sends GPS co-ordinates of user mobile device 104 (carried by the "tracked user" (not separately shown in the Figures) as he moves about on foot, by subway and automobile. The position information from GPS 128 is used to build location log 104, which reflects a history of the tracked user's positions, and can be used to derive other location information such as travel speeds, accelerations and the like. In this embodiment, GPS position information is received every minute. In other embodiments, the intermittent nature of the position information may be determined differently (for example, only sending position information when the user has moved a tenth of a mile at least). In this embodiment. The geographical positioning system is a GPS device. Alternatively, the geographic positioning system may be of some other type (now known or to be developed in the future). Still other embodiments, may not use a geographical positioning system at all (for example, having the tracked user manually send information from which geographical position can be derived). In this embodiment, the location log is maintained to only store the tracked user's positions for the immediately preceding 24 hour period.

Processing proceeds to operation S260, where question generation mod 310 receives a location information data set from tracking mod 302. In this embodiment, the location information data set is the entirety of location log 304 for the tracked user. Alternatively, the location information data set (not separately shown in the Figures may: (i) be a subset of the information in the location log; and/or (ii) include information derived from the position data in the location log (for example, travel speed information).

Processing proceeds to operation S265, where question generation mod 310 generates a set of questions based, at least in part, upon the location information data set. In this example, the questions generated are shown as Q1, Q2, Q3 and Q4 in screenshot 400 of FIG. 4. These questions will be respectively discussed in the following four (4) paragraphs.

Question Q1 asks how many bakeries the tracked user has visited since midnight (that is, on the present day). Question Q1 is based upon: (i) the position information of the tracked user's location information data set; and also on (ii) features of the geography located in proximity to locations in the location information data set. More specifically with respect to item (ii) in the preceding list, ancillary info data store includes location information for all bakeries in the vicinity of the tracked user's movements. Therefore, data store 312 allows question generation mod 310 to use the tracked user's location information to determine how many bakeries the user has visited. In this example, the bakeries are considered as "features of the geography" which happen to be manmade features. Alternatively, features of the geography may be natural (for example, natural landscape, weather) and/or may relate to events (for example, sporting events).

Question Q2 asks how far the tracked user travelled in a certain time period. Question Q2 is based upon the position information of the tracked user's location information data set. In this example, the time period is chosen because it reflects a time period during which the tracked user took a journey whose distance is likely to be remembered by the tracked user (and/or by people with a high level of knowledge about the tracked user's movements).

Question Q3 asks how fast the tracked user travelled during the journey alluded to in question Q2. In this example, question Q3 can only be reliably answered by the tracked user and/or other users who are familiar with the tracked user's highway driving habits. Note that question Q3 involves speed (derivable from location information), rather than location as such.

Question Q4 asks about the tracked user's location with respect to listening to a certain piece of music. In this example, the user's music listening is communicated from the tracked user's smart phone (in this example, user mobile device 104) to ancillary information data store 312. Question Q4 is based upon: (i) the position information of the tracked user's location information data set; and (ii) ancillary information. It is noted that the answer to question Q4 would likely be known only by the tracked user himself, and, unlike some of the previous questions, would likely not be reliably known even by close associates of the tracked user.

Questions Q1 to Q4 relate to location information of the tracked user's past positions. However, some embodiments may generate questions based on the tracked user's current position.

Processing proceeds to operation S270, where: (i) question generation mod 310 sends the questions, in series fashion, to user mobile device 104 (see FIG. 1) where the questions are displayed as shown in screenshot 400 (see FIG. 4); and (ii) evaluation mod 320 receives answers to each question from the tracked user through user mobile device 104 and network 114. The user who receives and answers questions is herein referred to as the "questioned user." In this example, the tracked user and the questioned user are the same individual person. Alternatively, the questioned user may be different (and may use a different device) than the tracked user. However, if the questioned user is different than the tracked user, then there should be a relationship between the tracked user and the questioned user such that the questioned user would reasonably be expected to know the answers to the track-user-location-related questions.

Processing proceeds to operation S275, where evaluation mod 320 evaluates whether the questioned user has given correct answer(s) to the question(s). In this example, all of the question(s) are based, at least in part, upon the tracked user's location information data set. Alternatively, only some of the question(s) may so relate.

On condition that the questioned user has provided at least one incorrect answer, processing proceeds to operation S285, where refusal mod 340 refuses to authenticate the questioned user, so that the questioned user is not allowed access to Acme database 215 (a database of confidential business records). (See FIG. 1.) In this example, the questioned user needs to get all of the answers correct in order to be authenticated. Alternatively, the questioned user may need to get only some of the answers correct. As a further alternative, a level of authentication (for example, level of access to Acme database 215) may depend upon the proportion of correct answers that the questioned user provides.

On condition that the questioned user has provided at least one correct answer, processing proceeds to operation S280, where authentication mod 330 authenticates the questioned user, so that the questioned user is allowed access to Acme database 215 (a database of confidential business records). (See FIG. 1.) This embodiment conditionally "authenticates" the questioned user because it uses the answers to the questions to establish an identity of the questioned user. Alternatively, there may be embodiments where the questioned user is not authenticated because his identity is not determined. For example, a social media site may allow a questioned user to email, through the social media site, to a tracked user only if the questioned user has a certain level of pre-existing real world knowledge about the tracked user. In this example, the social media site will already have authenticated the questioned user (for example, by conventional authentication methods), and the location-based questions will only be used to determine familiarity with the tracked user, rather than to determine the real world identity of the questioned user.

Figure 5:
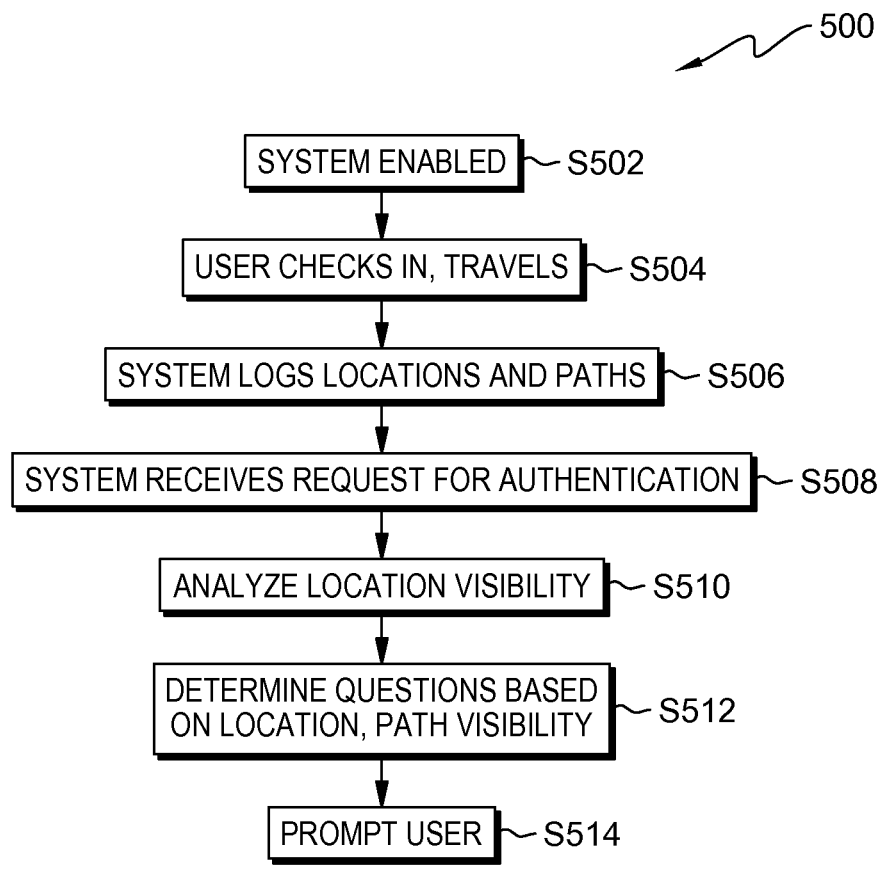
FIG. 5 shows a flowchart that represents a second embodiment of a method according to the present invention.

Flowchart 500 of FIG. 5 includes the following operations (with process flow among and between the operations as shown by arrows in FIG. 5): S502, S504, S506, S508, S510, S512, and S514.

III. FURTHER COMMENTS AND/OR EMBODIMENTS

Some embodiments of the present disclosure are directed to a method for authenticating a user in which the user is registered with an authentication system. The authentication system interfaces with a user tracking system to receive time stamped log(s) of locations and travel paths (herein sometimes referred to as "location history") of: (i) the user, and/or (ii) some other individual(s) whose location history would likely be known by the user such as, the user's friends, the user's family members and/or the user's acquaintances. Other individuals whose location history is likely to be known by a user are herein referred to as that user's "associates." In some embodiments, the user's associates will be individuals who are also registered with the same authentication system.

In response to receiving a request for authentication of a user with respect to a desired transaction, the authentication system prompts the user to answer one or more authentication question(s), (sometimes referred to herein as "challenge question(s)"), the challenge questions(s) based on: (i) information in the log of user location history; (ii) information in the log(s) of a user's associates' location histories; and/or (iii) aspects (for example, value and/or venue) of a desired transaction for which authentication is requested.

In some embodiments of the present invention, the user tracking system records the location history(ies) of a user's cellular phone and/or other mobile device(s), based on information from global positioning system (GPS) tracking, cellular network operation, WiFi usage, and/or other methods and information sources. (Note: the term "WiFi" may be subject to trademark rights in various jurisdictions throughout the world and are used here only in reference to the products or services properly denominated by the marks to the extent that such trademark rights may exist.)

When a transaction (or other interaction) requiring user authentication is attempted, challenge question(s) are presented to the user. A difficulty level of the challenge questions is selected based on at least one of: (i) a level of security commensurate with the transaction; and/or (ii) a deviation between the user's location history and normal patterns identified from information contained in the location history log(s). The difficulty level of the challenge questions is increased or decreased by requiring respectively more or less detailed knowledge of: (i) the user location history; (ii) the user's location history relative to location histories of the user's associates; and/or (iii) the nature of the transaction for which user authentication is requested. Based on the correctness of answers provided by a user in response to the challenge questions, and an authentication confidence level, the transaction may be approved or denied. In some embodiments of the present invention, determination of a desired authentication confidence level is based on a monetary value (amount of money) associated with the transaction that the user seeks to perform.

An authentication system in some embodiments of the present invention may include one, or more, of the following features, characteristics and/or advantages: (i) dynamically selects challenge question(s) for user authentication based on an authorized user's location history and/or travel paths; and/or (ii) selects an exclusivity level (also referred to herein as a "difficulty level") of the question(s) based on the desired security level of authentication which is based, for example, on transaction amount, type of account affected, likely modes of user transport, etc.

In some embodiments of the present invention, a user's location history (time stamped log(s) of locations and travel path information) is derived from times and locations of the user's smartphone or other mobile device(s) as logged by a tracking system with which the user is registered.

In some embodiments of the present invention, a higher exclusivity level for challenge questions makes use of the unlikelihood that an unauthorized user would: (i) be present in the same locations, and at the same times, as an authorized user; (ii) have taken the same travel paths, and at the same times, as an authorized user; and/or (iii) have knowledge of the authorized user's location history and/or travel paths.

In some embodiments of the present invention, a lower exclusivity level may be appropriate, for example, for a (pre-determined) modest-value credit card transaction at a local retailer. In such a case, the authentication system asks a user to indicate the path the user travelled to arrive at the local retailer location (for example, by presenting a local map and asking the user to trace a travel path on the map, the path recently travelled by the user). This helps prevent an unauthorized user from using a credit card, in some situations, since the unauthorized user would not know what route the credit card owner travelled to arrive at the retailer's location. Further, taking into consideration that the owner may not have traveled to the retailer's location, a correct answer to the challenge question may not exist, and any answer will be considered to be wrong. In some embodiments of the present invention, the authentication system recognizes that the credit card owner is present elsewhere (not at the retailer's location) at the time of the attempted transaction. In response, the authentication system alerts the retailer, the credit card owner, and/or law enforcement of a suspected attempted fraudulent credit card transaction in progress.

Some embodiments of the present invention make use of more complex authentication methods. For example, a set of challenge questions are based on multiple locations that a credit card owner has visited wherein no other user has been at all of the same locations, at the same respective times, as the owner. This combination of physical visibility attempts to deny any user, other than an authorized user, knowledge of answers to the set of challenge questions.

In some embodiments of the present invention, the service is run as a server side application as part of a social network or location tracking system as follows: (i) a user attempts to complete a transaction; (ii) a third party site requests a set of challenge question(s), at a specified difficulty level, from a social networking server; (iii) the third party site receives the question(s) from the social networking server, presents them to the user, and prompts the user for answer(s); (iv) the third party site receives answer(s) given by the user and sends them to the social networking server; (v) the social networking server evaluates the answer(s); (vi) the social networking server sends a response to the third party site indicating whether the answer(s) are correct; and/or (vii) the third party site indicates whether the transaction is approved or denied.

In some embodiments, a user's network information is not distributed over the internet and thus not easily discoverable by an unauthorized user.

In some embodiments of the present invention, the authentication system is able to determine: (i) which particular locations are frequented by a user; (ii) who has not previously accompanied the user in particular locations; (iii) who frequently accompanies the user in particular locations; and/or (iv) the strength of a physical location relationship. For example, if friend A and friend B have not previously accompanied each other at a particular location, the authentication assumes they could not have exchanged information about a user's location in unmonitored general conversation.

In some embodiments of the present invention, the authentication system does not ask questions regarding a user's path from their home to a current location because the user's home address would be easily obtained from a stolen wallet or purse. If the user travelled from their home to the location where they are attempting to make a transaction, the authentication system instead asks the user to trace a route taken previously, for example, for lunch earlier the same day.

Some embodiments of the present invention add further precision and exclusivity (that is, difficulty) to the challenge question(s) by: (i) trending a user's location history to determine when abnormal locations or paths are taken; (ii) formulating challenge questions based on the abnormal locations or paths; and/or (iii) minimizing the likelihood that an unauthorized user could know the answers to the challenge questions. Some embodiments further trend other users' location histories and formulate challenge question(s) based on location history of an authorized user that other users do not frequent, thereby decreasing the probability that an unauthorized user would know an authorized user's location history.

Scenarios presented in the following paragraphs illustrate operation of some embodiments of the present invention.

Scenario #1: Jon drives from work to a supermarket. Jon's attempted purchase amount is $35. The authentication system determines $35 is a low transaction amount and requests authentication level 2 (1=Lowest; 10=Highest). The authentication system presents Jon with a map and asks him to trace the path he took in travelling to the supermarket.

Scenario #2: (Assume Jon is social networking friends with Mary, Andrew and Paul.)

Jon and Mary were at location A while Paul and Andrew were at location B (20 miles away) at 10 am. Jon and Andrew were at location B while Paul was at location C (15 miles away) and Mary was at location D (10 miles away) at 2 pm. Jon and Paul were at Location E while Mary and Andrew were at Location F (12 miles away) at 5 pm.

Jon attempts to make a $3000 purchase. The authentication system determines $3000 is a high transaction amount and requests authentication level 8 (1=Lowest; 10=Highest). The authentication system presents a map and asks Jon to place the times (10 am, 2 pm and 5 pm) that he was present at locations A, B, and E. The authentication system then presents the names of Andrew, Mary and Paul, and asks Jon to place them with their respective locations at the respective times.

Scenario #3:

Jon goes for a bicycle ride at 3 pm., an abnormal activity for Jon (he seldom goes for a bike ride.) Mary, Andrew and Paul have not previously gone on bicycle rides. Jon rides to a retail location (using an abnormal path) and uses his credit card to make a purchase. The authentication system determines the purchase is a medium transaction amount and requests authentication level 5 (1=Lowest; 10=Highest). The authentication system asks Jon to trace the abnormal path he travelled to arrive at the retail location.

Some embodiments of the present invention may include one, or more, of the following features, characteristics and/or advantages: (i) bases visibility of a user's movements on physical locations and paths, without regard to a user's location history as recorded in social media; (ii) takes into account a user's path, home location, frequency of travel to/from various locations and/or paths taken, to determine if there may be overlap; (iii) makes use of a user's memory of paths taken and/or locations visited, which for some people may be easier to recall than social network activities; and/or (iv) takes into consideration other locations visited by a user to determine locations where not all others could have been present. With regard to item (i) above, some people are not active on social media networks, so the questions needed in a given time period may exceed the quantity of transactions.

In some embodiments of the present invention, spoofing can be detected and thwarted. For example, when a first (malicious) user, masquerading as a second user known to a third user, attempts to communicate with the third user (for example via a phone call, email, or text message), the third user's mobile device communicates with the first user's device to determine the first user's physical location and/or location history. The third user can then look up the physical location of the second user, for example on a social network site, to determine if the first and second users' physical locations match. If the locations do not match, the third user has cause to suspect the first user is not in fact the second user, and might instead be a malicious user attempting to gain illegitimate access to information for which he is not authorized.

Some embodiments of the present invention further allow for more complex questioning related to the locations by looking to see who was not in the vicinity of a user at different times, to try to find a set of physical locations at which no other user was present during the same times the user was present at those locations. This information can be used to create a unique set of questions, related to location history, which an unauthorized user would be unable to answer correctly.

Some embodiments of the present invention determine a need for more complex challenge questions (having more exclusivity) according to the level of confidentiality of the information in a conversation or text message. Embodiments utilize natural language processing to analyze a phone conversation or text messages and determine if the information is related to other knowledge based authentication questions (for example, "what is your dog's name," "where do you bank," etc.) or is related to a user's personal information such as date of birth, social security number and so on.

Some embodiments of the present invention may include one, or more, of the following features, characteristics and/or advantages: (i) a method for authenticating a user comprising (not necessarily in the following order): (a) registering a user to an authentication system, (b) receiving a log of user locations of the user, (c) receiving a request for authenticating the user, and (d) prompting the user to an answer an authentication question based on the log of user locations; (ii) a difficulty of the authentication question is based on a level of security required for a transaction; (iii) the difficulty is increased by the authentication question(s) requiring knowledge of a plurality of locations in the log of user locations; (iv) a difficulty of the authentication question is increased based on a current location deviating from the log of user locations; and/or (v) a method for authenticating a user comprising (not necessarily in the following order): (a) registering a user to an authentication system; receiving a log of user locations of the user, and (b) receiving a request for authenticating the user; and prompting the user to an answer an authentication question based on the log of user locations wherein a difficulty of the authentication question is increased based on a current location deviating from the log of user locations.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Machine logic: any logic accomplished by hardware, software and/or firmware.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving, by an authentication system, a request to authorize, at a desired authentication confidence level, a questioned user, to access a database;
   receiving, by the authentication system, a first information dataset from a user tracking system, indicative of a first plurality of locations traversed by an authorized user over a time period, where the authorized user is authorized to access the database;
   receiving, by the authentication system, a second information dataset from the user tracking system, indicative of a second plurality of locations traversed, over the time period, by a user related to the authorized user;
   generating, by the authentication system, a first question based, at least in part, upon a combination of the first information dataset, the second information dataset, and the desired authentication confidence level;
   sending, by the authentication system, the first question to a display device for display to the questioned user;
   receiving, by the authentication system, an answer data set in response to the first question;
   determining, by the authentication system, that the answer data set represents a correct answer to the first question; and
   in response to determining that the answer data set represents a correct answer to the first question, authorizing, by the authentication system, the questioned user to access the database.

2. The method of claim 1, further comprising:
   determining, by the authentication system, that the questioned user's answer to the first question is an incorrect answer; and
   in response to determining that the questioned user's answer to the first question is an incorrect answer, refusing, by the authentication system, to grant authorization to the questioned user to access the database.

3. The method of claim 1, further comprising:
   determining, by the authentication system, that a desired authentication confidence level is a high level;
   in response to determining the desired authentication confidence level is a high level, receiving, by the authentication system, information from the user tracking system, indicative of a plurality of locations traversed by a user related to the authorized user, over the time period;
   generating, by the user tracking system, a second location information data set that includes information related to the plurality of locations traversed by the user related to the authorized user over the time period;
   generating, by the authentication system, a second question based, at least in part, upon a combination of the first location information data set and the second location information data set;
   sending, by the authentication system, the second question to the display device for display to the questioned user;
   receiving, by the authentication system, second answer data set;
   determining, by the authentication system, that the second answer data set represents a correct answer to the second question; and
   in response to determining that the second answer data set represents a correct answer to the second question, authorizing, by the authentication system, the questioned user to access the database.

4. The method of claim 3, wherein determination of the desired authentication confidence level is based, at least in part, on a monetary value associated with access to the database.

5. The method of claim 1, wherein generation of the first question is further based upon criteria selected from the group consisting of: (i) features of geography located in proximity to locations represented in the location information data set; (ii) distances traveled by the authorized user as reflected in the location information data set; (iii) speeds traveled by the authorized user as reflected in the location information data set; (iv) likely modes of transport used by the authorized user based upon locations in the location information data set; (v) ancillary activities performed by the authorized user at locations represented in the location information data set; and (vi) information related to locations occupied over the time period of the user related to the authorized user.

6. A computer program product comprising a computer readable storage medium having stored thereon program instructions programmed to perform:
   receiving, by an authentication system, a request to authorize, at a desired authentication confidence level, a questioned user, to access a database;
   receiving, by the authentication system, a first information dataset from a user tracking system, indicative of a first plurality of locations traversed by an authorized user over a time period, where the authorized user is authorized to access the database;
   receiving, by the authentication system, a second information dataset from the user tracking system, indicative of a second plurality of locations traversed, over the time period, by a user related to the authorized user;
   generating, by the authentication system, a first question based, at least in part, upon a combination of the first information dataset, the second information dataset, and the desired authentication confidence level;
   sending, by the authentication system, the first question to a display device for display to the questioned user;
   receiving, by the authentication system, an answer data set in response to the first question;
   determining, by the authentication system, that the answer data set represents a correct answer to the first question; and
   in response to determining that the answer data set represents a correct answer to the first question, authorizing, by the authentication system, the questioned user to access the database.

7. The computer program product of claim 6, wherein the computer readable storage medium further has stored thereon program instructions programmed to perform:
   determining, by the authentication system, that the questioned user's answer to the first question is an incorrect answer; and
   in response to determining that the questioned user's answer to the first question is an incorrect answer, refusing, by the authentication system, to grant authorization to the questioned user to access the database.

8. The computer program product of claim 6, wherein the computer determining, by the authentication system, that a desired authentication confidence level is a high level;
   in response to determining the desired authentication confidence level is a high level, receiving, by the authentication system, information from the user tracking system, indicative of a plurality of locations traversed by a user related to the authorized user, over the time period;
   generating, by the user tracking system, a second location information data set that includes information related to the plurality of locations traversed by the user related to the authorized user over the time period;
   generating, by the authentication system, a second question based, at least in part, upon a combination of the first location information data set and the second location information data set;
   sending, by the authentication system, the second question to the display device for display to the questioned user;
   receiving, by the authentication system, second answer data set;
   determining, by the authentication system, that the second answer data set represents a correct answer to the second question; and
   in response to determining that the second answer data set represents a correct answer to the second question, authorizing, by the authentication system, the questioned user to access the database.

9. The computer program product of claim 8, wherein determination of the desired authentication confidence level is based, at least in part, on a monetary value associated with access to the database.

10. The computer program product of claim 6, wherein generation of the first question is further based upon criteria selected from the group consisting of: (i) features of geography located in proximity to locations represented in the location information data set; (ii) distances traveled by the authorized user as reflected in the location information data set; (iii) speeds traveled by the authorized user as reflected in the location information data set; (iv) likely modes of transport used by the authorized user based upon locations in the location information data set; (v) ancillary activities performed by the authorized user at locations represented in the location information data set; and (vi) information related to locations over the time period of the user related to the authorized user.

11. A computer system comprising
   a processor(s) set; and
   a computer readable storage medium
   wherein the processor(s) set is structured, located, connected and/or programmed to execute instructions stored on the computer readable storage medium; and the instructions include instructions programmed to perform:
      receiving, by an authentication system, a request to authorize, at a desired authentication confidence level, a questioned user, to access a database;
      receiving, by the authentication system, a first information dataset from a user tracking system, indicative of a first plurality of locations traversed by an authorized user over a time period, where the authorized user is authorized to access the database;
      receiving, by the authentication system, a second information dataset from the user tracking system, indicative of a second plurality of locations traversed, over the time period, by a user related to the authorized user;
      generating, by the authentication system, a first question based, at least in part, upon a combination of the first information dataset, the second information dataset, and the desired authentication confidence level;
      sending, by the authentication system, the first question to a display device for display to the questioned user;
      receiving, by the authentication system, an answer data set in response to the first question;
      determining, by the authentication system, that the answer data set represents a correct answer to the first question; and
      in response to determining that the answer data set represents a correct answer to the first question, authorizing, by the authentication system, the questioned user to access the database.

12. The computer system of claim 11, wherein the program instructions further include instructions to perform:
   determining, by the authentication system, that the questioned user's answer to the first question is an incorrect answer; and
   in response to determining that the questioned user's answer to the first question is an incorrect answer, refusing, by the authentication system, to grant authorization to the questioned user to access the database.

13. The computer system of claim 11, wherein the program instructions further include instructions to perform:
   determining, by the authentication system, that a desired authentication confidence level is a high level;
   in response to determining the desired authentication confidence level is a high level, receiving, by the authentication system, information from the user tracking system, indicative of a plurality of locations traversed by a user related to the authorized user, over the time period;
   generating, by the user tracking system, a second location information data set that includes information related to the plurality of locations traversed by the user related to the authorized user over the time period;
   generating, by the authentication system, a second question based, at least in part, upon a combination of the first location information data set and the second location information data set;
   sending, by the authentication system, the second question to the display device for display to the questioned user;
   receiving, by the authentication system, a second answer data set;
   determining, by the authentication system, that the second answer data set represents a correct answer to the second question; and
   in response to determining that the second answer data set represents a correct answer to the second question, authorizing, by the authentication system, the questioned user to access the database.

14. The computer system of claim 13, wherein determination of the desired authentication confidence level is based, at least in part, on a monetary value associated with access to the database.

15. The computer system of claim 11, wherein generation of the first question is further based upon criteria selected from the group consisting of: (i) features of geography located in proximity to locations represented in the location information data set; (ii) distances traveled by the authorized user as reflected in the location information data set; (iii) speeds traveled by the authorized user as reflected in the location information data set; (iv) likely modes of transport used by the authorized user based upon locations in the location information data set; (v) ancillary activities performed by the authorized user at locations represented in the location information data set; and (vi) information related to locations over the time period of the user related to the authorized user.

16. The method of claim 1 wherein input data for the user tracking system is based, at least in part, on information derived from global positioning system (GPS) tracking data.

17. The method of claim 1 wherein input data for the user tracking system is based, at least in part, on information derived from cellular network operation.

18. The method of claim 1 wherein input data for the user tracking system is based, at least in part, on information derived from WiFi usage.

* * * * *